(12) United States Patent
Hayashi

(10) Patent No.: US 7,441,140 B2
(45) Date of Patent: Oct. 21, 2008

(54) SIGNAL PROCESSING SYSTEM

(75) Inventor: Kazumi Hayashi, Nogoya (JP)

(73) Assignee: Denso Corporation, Kariya (JP)

( * ) Notice: Subject to any disclaimer, the term of this patent is extended or adjusted under 35 U.S.C. 154(b) by 593 days.

(21) Appl. No.: 11/229,244

(22) Filed: Sep. 16, 2005

(65) Prior Publication Data

US 2006/0070017 A1    Mar. 30, 2006

(30) Foreign Application Priority Data

Sep. 17, 2004    (JP)    ............................. 2004-271380

(51) Int. Cl.
    *G06F 11/00* (2006.01)
(52) U.S. Cl. ............................. 714/3; 714/10
(58) Field of Classification Search ............ 714/3, 714/10
    See application file for complete search history.

(56) References Cited

U.S. PATENT DOCUMENTS 5,020,059 A * 5/1991 Gorin et al. ............... 714/3
5,655,069 A * 8/1997 Ogawara et al. ............... 714/10
5,737,711 A 4/1998 Abe
6,910,155 B2 * 6/2005 Ku ............................. 714/30
2004/0062095 A1 * 4/2004 Templeton et al. ........... 365/200
2005/0278588 A1 * 12/2005 Cohn et al. .................... 714/51

FOREIGN PATENT DOCUMENTS

| JP | 8-044581 | 2/1996 |
| JP | 8-136410 | 5/1996 |
| JP | 2000-081991 | 3/2000 |
| JP | 2003-309509 | 10/2003 |

* cited by examiner

*Primary Examiner*—Joshua A Lohn
(74) *Attorney, Agent, or Firm*—Harness, Dickey & Pierce, PLC

(57) ABSTRACT

A signal processing system comprises multiple signal processors, each having functional blocks. A control circuit selects one of the signal processors as a target processor, and configures an inspection circuit having equivalent functions to the target processor in a reconfigurable circuit, and retrieves input/output data from each functional block of the target processor to perform inspection on the functional block by using the configured inspection circuit and the input/output data to produce an inspection result. The functional block is replaced with a substitute circuit which forms part of the inspection circuit when the inspection result indicates that the functional block is faulty.

20 Claims, 15 Drawing Sheets

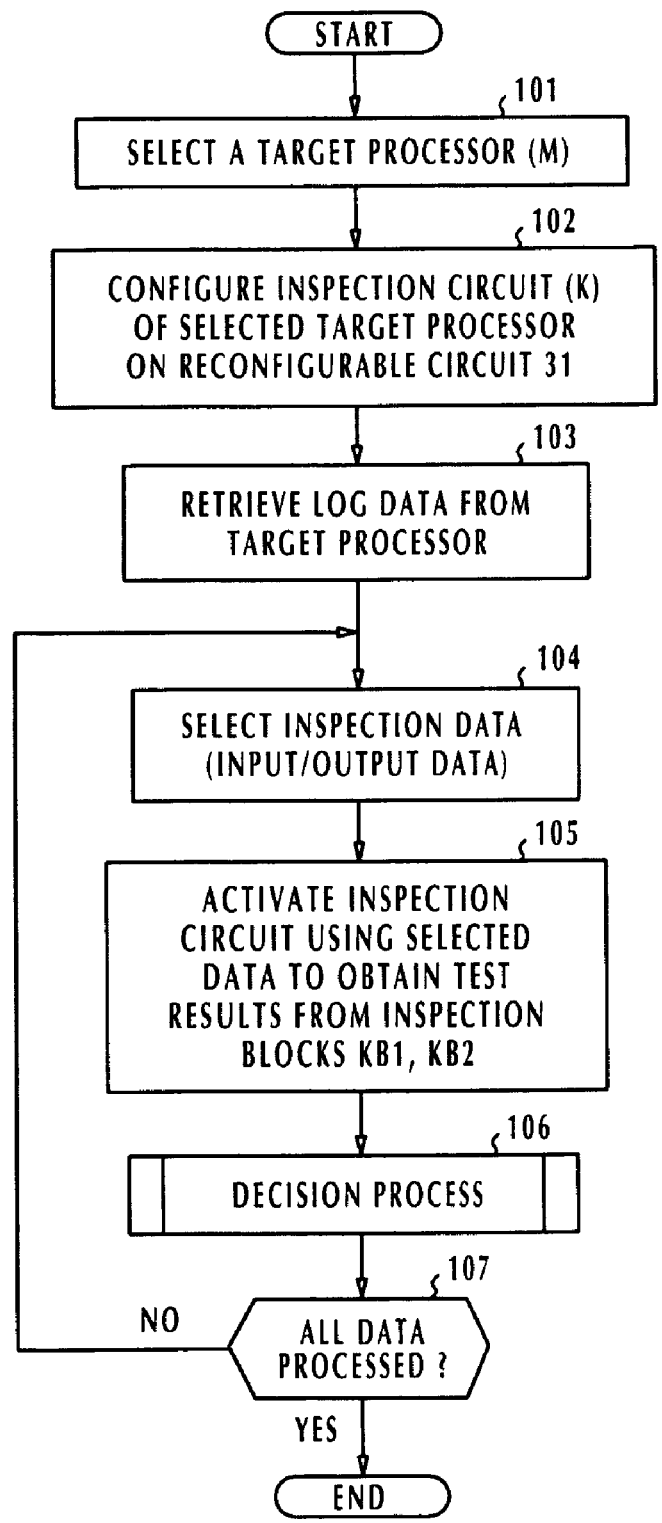

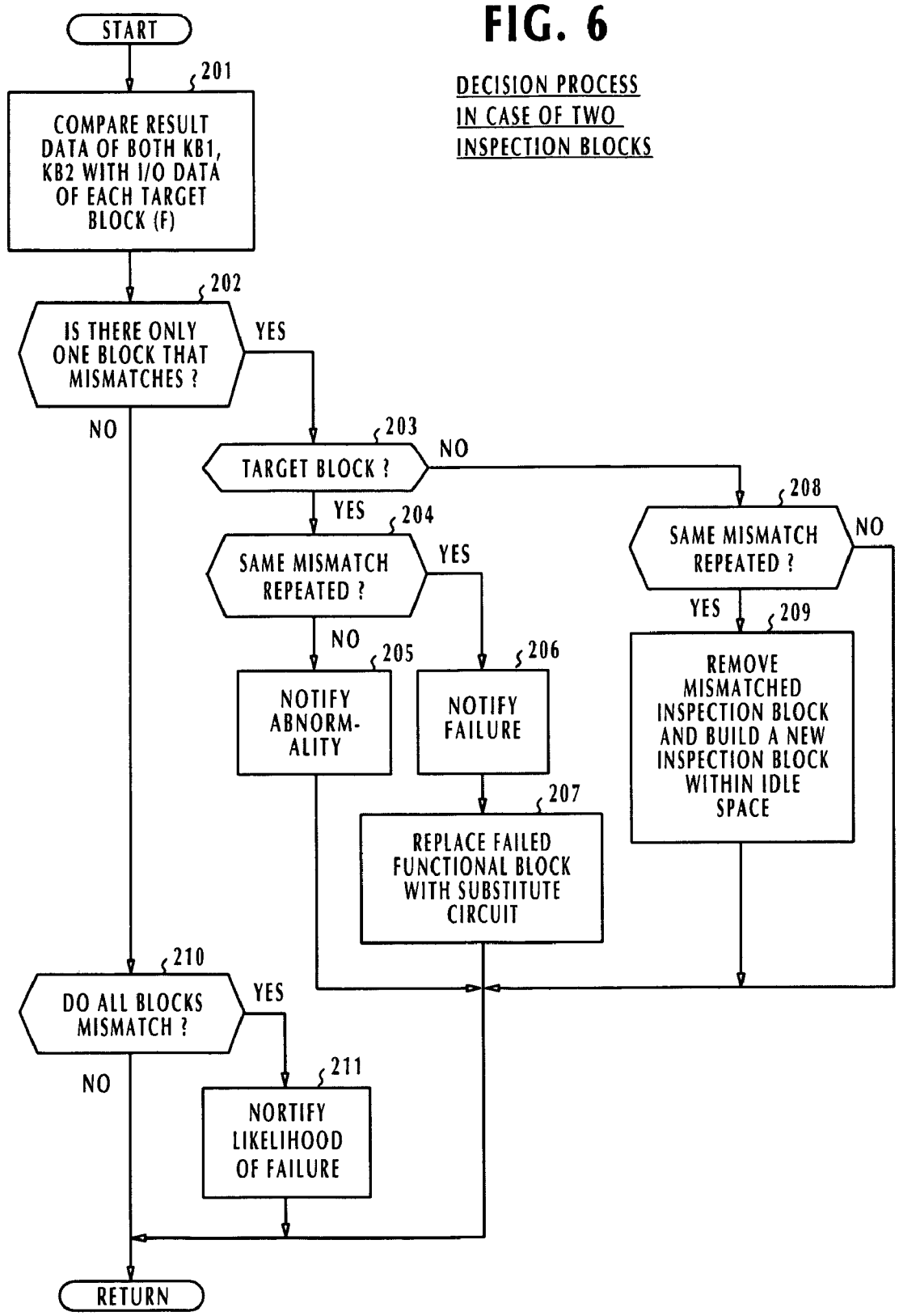

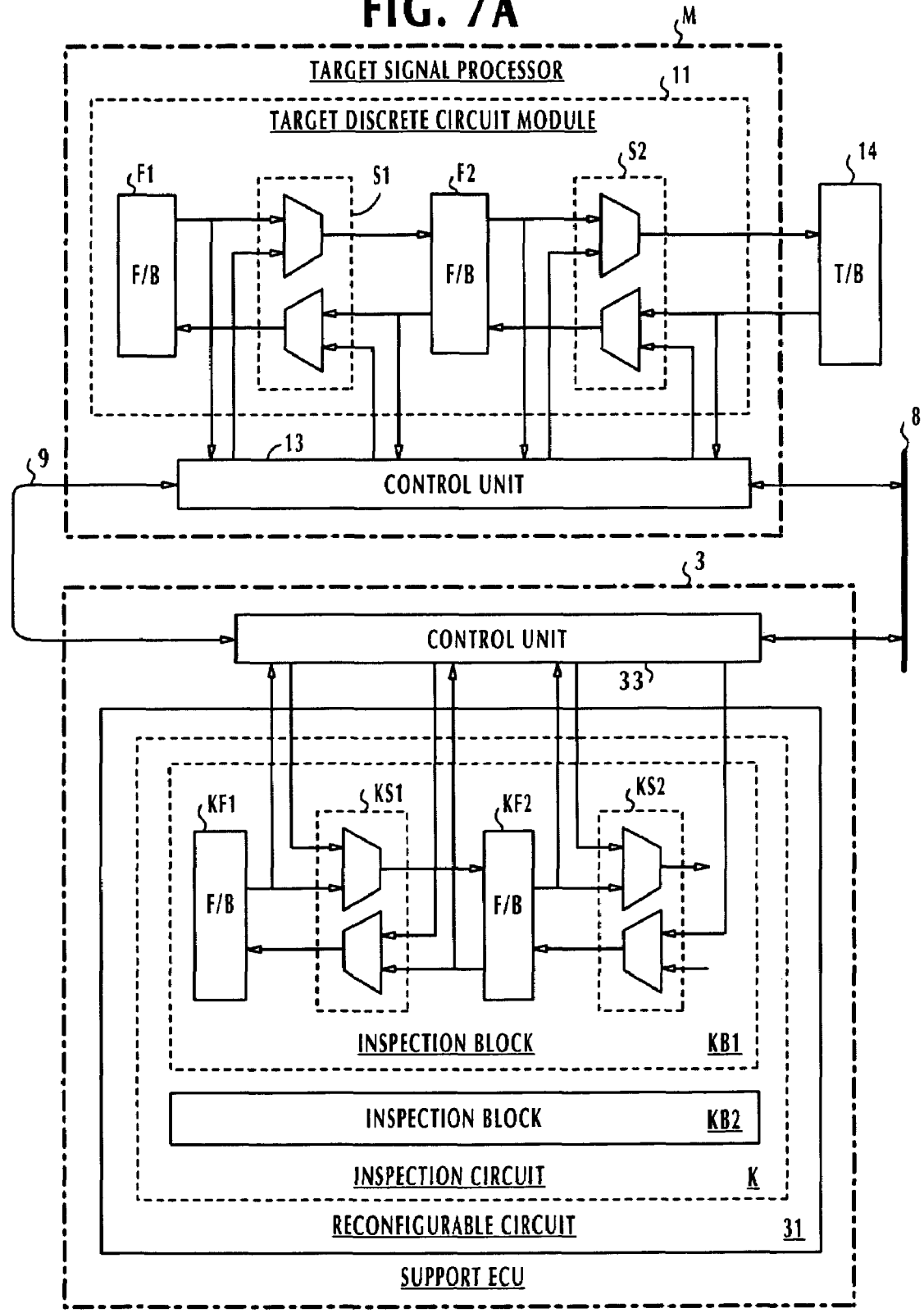

DECISION PROCESS IN CASE OF TWO INSPECTION BLOCKS

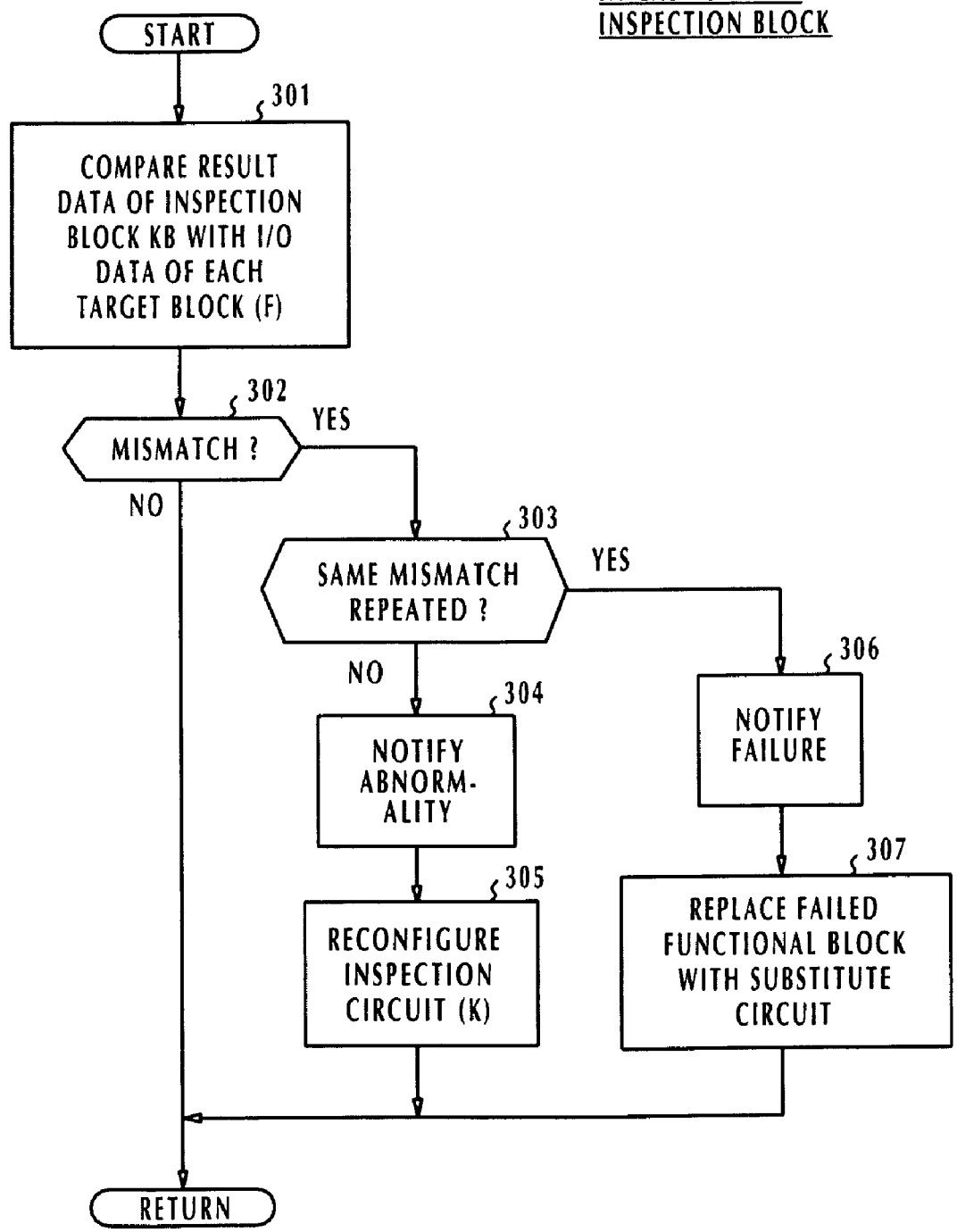

SIGNAL PROCESSING SYSTEM

CROSS-REFERENCE TO RELATED APPLICATION

This application is based on Japanese Patent Application No. 2004-271380, filed Sep. 17, 2004, which is incorporated herein by reference.

BACKGROUND OF THE INVENTION

1. Field of the Invention

The present invention relates to a signal processing system comprising a plurality of signal processors interconnected through a network, one of the signal processors being provided with a reconfigurable circuit. The present invention is particularly useful for application to automotive vehicles.

2. Description of the Related Art

As disclosed in U.S. Pat. No. 5,655,069 and Japanese Patent Publication 2000-81991, it is known to use a reconfigurable circuit of programmable logic devices to build an electronic circuit according to downloaded data that describes the hardware of the circuit. In the prior art systems, there is provided a spare unit that comprises a reconfigurable circuit in addition to multiple signal processors each performing an individual circuit function. When one of the signal processors fails, the spare unit is reconfigured to build a substitute circuit to implement part or whole of the failed processor. Self-healing function and fail-safe function are realized in this manner. During the time a circuit reconfiguration proceeds, the failed unit is configured out of the system.

Since the configuration of a substitute circuit in the reconfigurable circuit begins in response to the occurrence of a failure, the prior art system has to wait a long time to recover from the failure until the substitute circuit can be put to use.

Therefore, a need exists to provide a signal processing system capable of recovering from failure in a short period of time.

SUMMARY OF THE INVENTION

It is therefore an object of the present invention to provide a signal processing system capable of instantly recovering from a failure by using a substitute circuit pre-configured in a reconfigurable circuit.

According to a first aspect of the present invention, there is provided a signal processing system comprising a plurality of signal processors, each having a plurality of functional blocks, a reconfigurable circuit, and control circuitry associated with the signal processors and the reconfigurable circuit, the control circuitry selecting one of the signal processors as a target processor, configuring an inspection circuit having equivalent functions to the target processor in the reconfigurable circuit, retrieving input/output data from each functional block of the target processor, performing inspection on the functional block by using the inspection circuit and the input/output data to produce an inspection result, and replacing the functional block with a substitute circuit which forms part of the inspection circuit if the inspection result indicates that the functional block is faulty.

Since the substitute circuit forms part of the inspection circuit which is already configured on the reconfigurable circuit, there is no need for the signal processing system to wait a long time which would otherwise be taken to configure a substitute circuit.

Since the inspection circuit is shared by the signal processors, the system scale can be kept to a minimum. Further, the replacement with the substitute circuit is performed on a per-functional block basis, rather than on a per-signal processor basis, the reconfigurable circuit can be efficiently utilized.

Preferably, the control circuitry replaces the faulty functional block with a substitute circuit if the inspection result repeatedly indicates that the functional block is likely to fail. This avoid useless replacement which could occur as a result of the system being interfered with external noise.

Preferably, the control circuitry configures the substitute circuit in the reconfigurable circuit if the inspection result indicates that the functional block of the target processor is likely to fail and replaces the functional block with the configured substitute circuit if the inspection result subsequently indicates that the functional block is faulty. This avoid useless replacement which could occur as a result of the system being interfered with external noise.

Preferably, the target processor includes a reconfigurable circuit, and the control circuitry configures the substitute circuit in the reconfigurable circuit of the target processor. This eliminates possible low system performance which would occur in due to a delay associated with the propagation of signals between the control circuitry and the target signal processor.

Preferably, the inspection circuit comprises a plurality of inspection blocks having respective functions equivalent to the functional blocks of the target processor. The control circuitry performs inspection on the functional block by using the plurality of inspection blocks and the input/output data to produce an inspection result indicating whether the functional block or one of the inspection blocks on the reconfigurable circuit. If the number of inspection blocks used for inspecting the functional block is at least three, a majority decision algorithm can be advantageously used to make a valid decision even if there is variability in results obtained from the inspection blocks. If the inspection result indicates that one of the inspection blocks is faulty, the control circuitry preferably configures a substitute inspection circuit in an idle space of the reconfigurable circuit and inhibits the use of the area of the reconfigurable circuit where the faulty inspection block is configured.

According to a second aspect of the present invention, there is provided a method of restoring a signal processing system from failure, wherein the signal processing system comprises a reconfigurable circuit and a plurality of signal processors each having a plurality of functional blocks, comprising the steps of (a) selecting one of the signal processors as a target processor, (b) configuring an inspection circuit having equivalent functions to the target processor in the reconfigurable circuit, (c) retrieving input/output data from each functional block of the target processor, (d) performing inspection on the functional block by using the inspection circuit and the input/output data to produce an inspection result, and (e) replacing the functional block with a substitute circuit which forms part of the inspection circuit if the inspection result indicates that the functional block has failed.

BRIEF DESCRIPTION OF THE DRAWINGS

The present invention will be described in detail with reference to the following drawings, in which:

FIG. 5 is a flowchart of the operation of the control unit of the support ECU according to the present invention;

FIG. 6 is a flowchart of a decision process which forms part of the routine of FIG. 5 according to a first embodiment of the present invention;

FIG. 7A is a block diagram of a signal processor and the support ECU in which two inspection blocks are configured in the reconfigurable circuit according to the first embodiment of the present invention;

FIG. 12 is a flowchart of a further modification of the decision process of FIG. 5 according to a fourth embodiment of the present invention;

DETAILED DESCRIPTION

Figure 1:
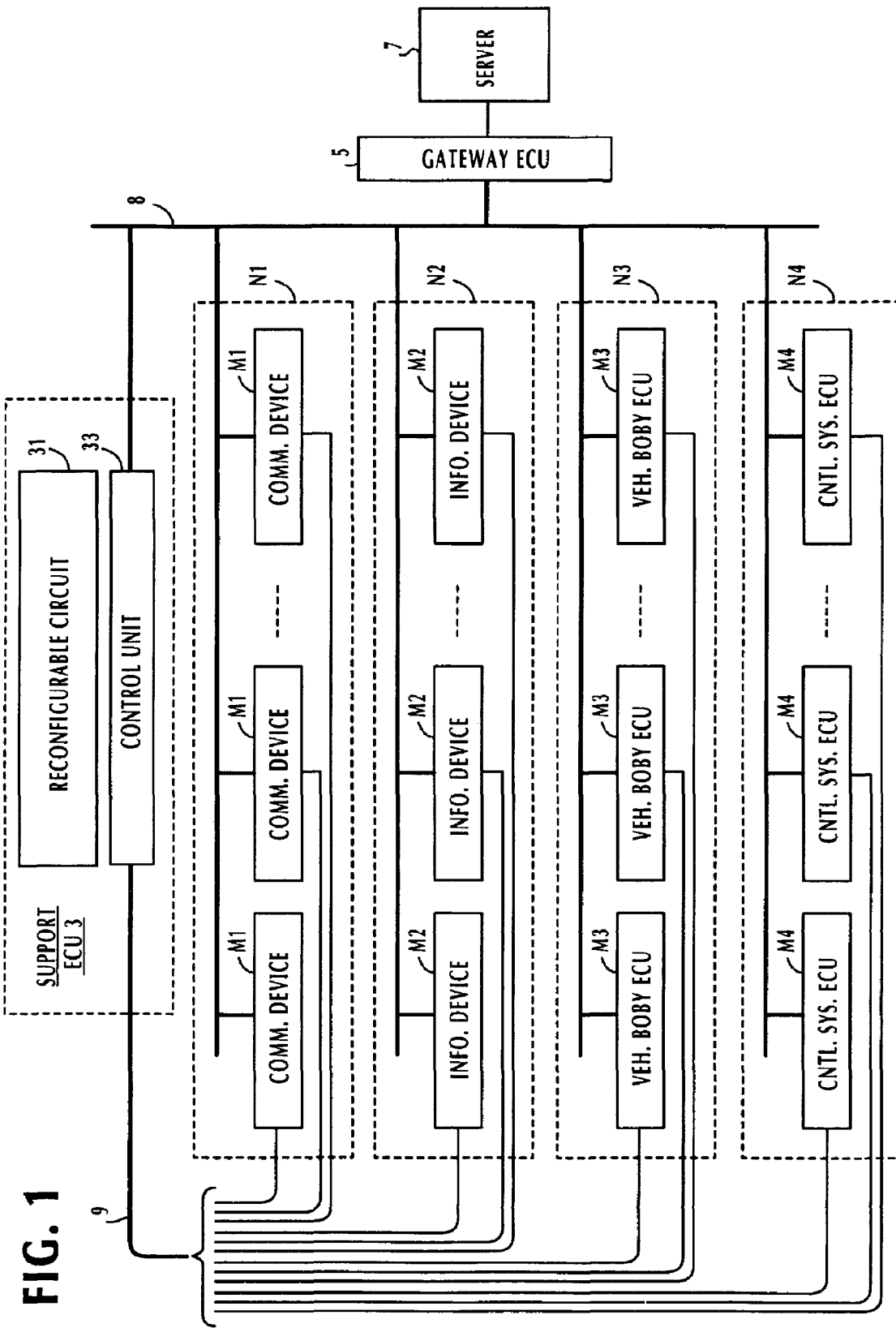
FIG. 1 is a block diagram of a signal processing system of the present invention.

In FIG. 1, there is shown a vehicle-mounted signal processing system which comprises a plurality of LAN (Local Area Network) segments N1, N2, N3 and N4 of signal processors M connected through a LAN 8 to a gateway ECU (electronic control unit) 5, which is coupled to a server 7. Further provided is a support ECU 3 that serves as a standby unit for protecting the system if a failure occurs in one of the signal processors of any of the LAN segments N1 through N4. Support ECU 3 includes a reconfigurable circuit 31 and a control-and-control unit 33, which is connected to the LAN 8.

The signal processors of the LAN segment N1 are communication devices M1 such as VICS (Vehicle Information and Communication System) wireless transceiver, mobile wireless telephone, ETC Electronic Toll Collection system) transceiver, and TV and radio receivers. The signal processors of the LAN segment N2 are information devices M2 such as navigator for displaying maps, DVD and audio systems, and ETC device that communicates with an ETC base station using the ETC transceiver to perform a toll charge control. The signal processors of the LAN segment N3 are vehicle body ECUs M3 such as meter ECU for controlling the display of various vehicle I/O data on the vehicle's control panel, crime prevention ECU and air-conditioner control ECU. The signal processors of the LAN segment N4 are system control ECUs M4 such as engine control ECU, electronic controlled automatic power transmission ECU, vehicle stability control ECU, and auto-cruising control ECU.

The signal processors of all LAN segments are connected through individual lines 9 to the control-and-control unit 33 of the support ECU 3 to permit two-way communication to proceed between a signal processor and the support ECU 3 when a failure occurs in that signal processor.

Figure 2:
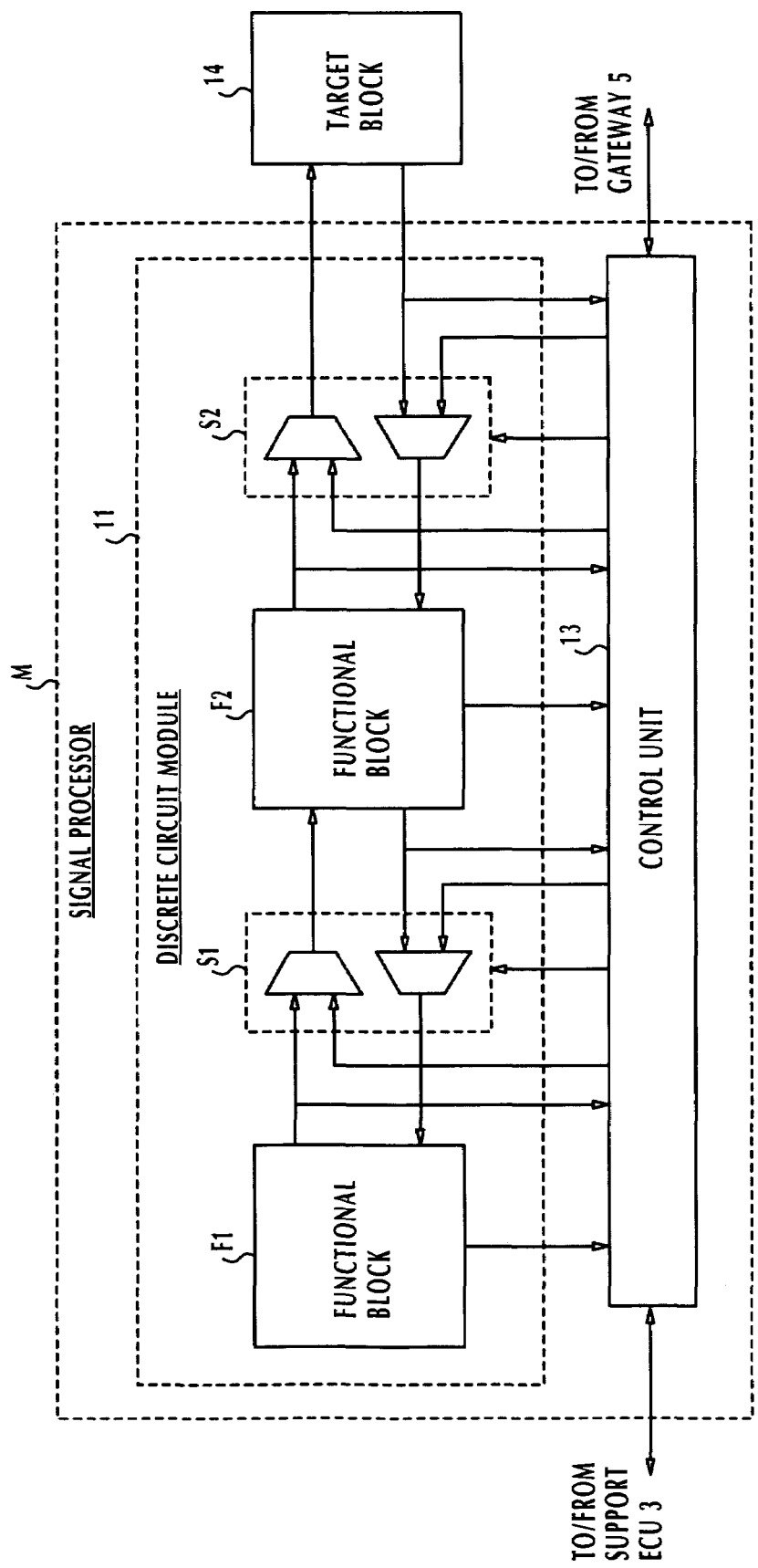
FIG. 2 is a block diagram of a signal processor.
Figure 3A:
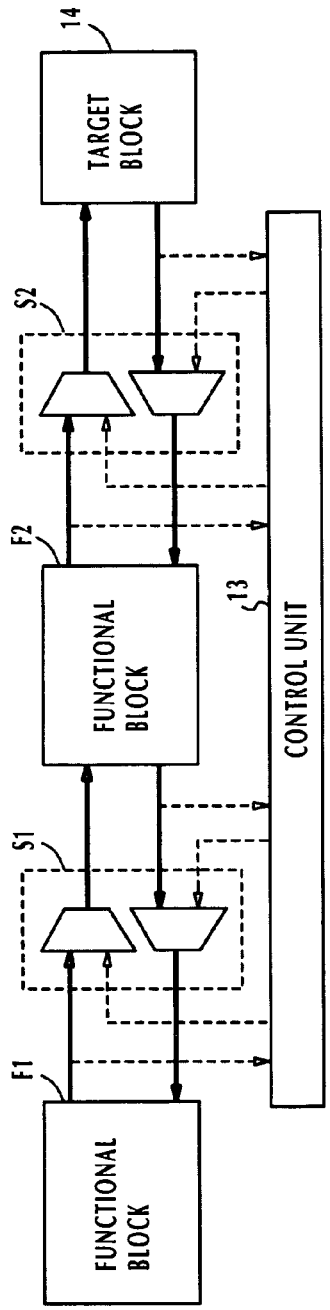
FIGS. 3A, 3B, 3C are schematic block diagrams of the signal processor, with thick lines indicating different flow of signals that occur in respective modes of operation.
Figure 3B:
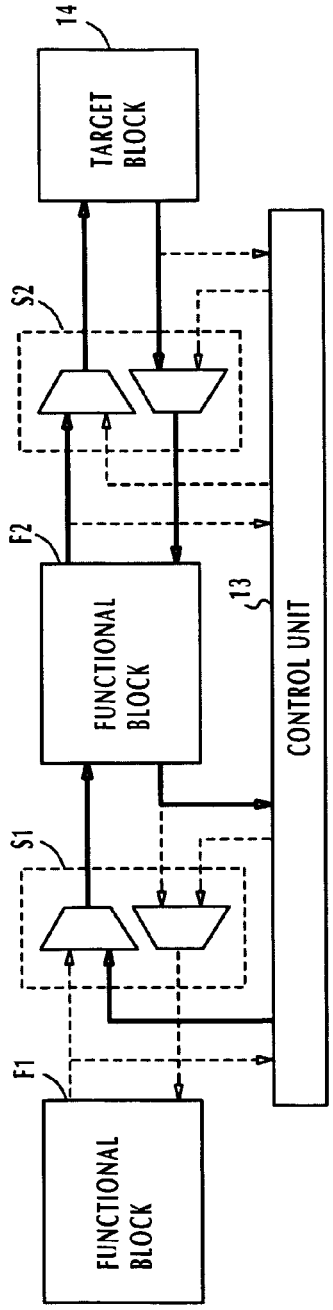
Figure 3C:
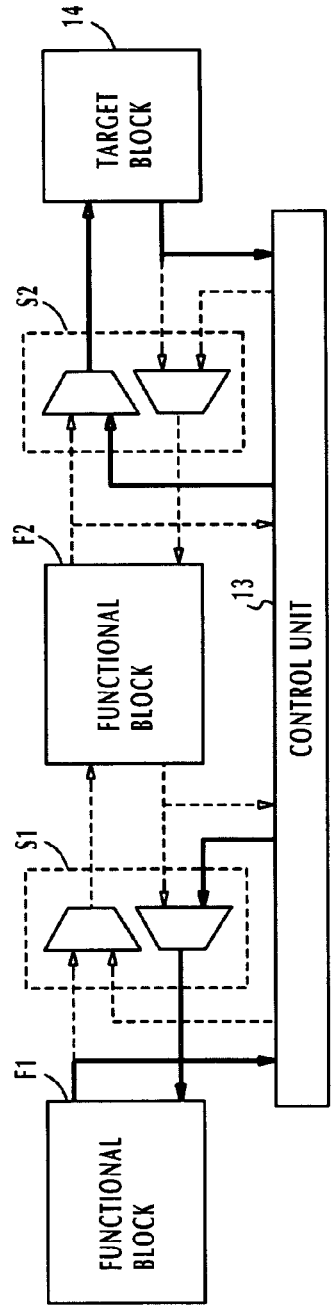

FIG. 2 is a block diagram of a typical signal processor M of the present invention. The signal processor M comprises a discrete circuit module 11 that drives a target block 14 and an control unit 13, which performs control on the discrete circuit module 11 and interfaces it to the support ECU 3 and the gateway 5. Discrete circuit module 11 is comprised of successively arranged functional blocks F1, F2 and selectors S1, S2. Each selector is connected between adjacent functional blocks F1, F2 or between functional block F2 and the target device 14 and is responsive to a control signal from the control unit 13 for selectively coupling signals between the associated blocks. Discrete circuit module M supplies I/O data to the control unit 13 as a monitor signal indicating the status of the functional blocks F1, F2 and target block 14. By controlling the selectors S1 and S2, failed functional blocks can be isolated from the system as shown in FIGS. 3A, 3B and 3C in thick lines. FIG. 3A shows the passages of signals of all blocks when the functional blocks are operating normally. FIGS. 3B and 3C illustrate the signal passages when the functional blocks F1 and F2 are respectively isolated from the system.

Figure 4B:
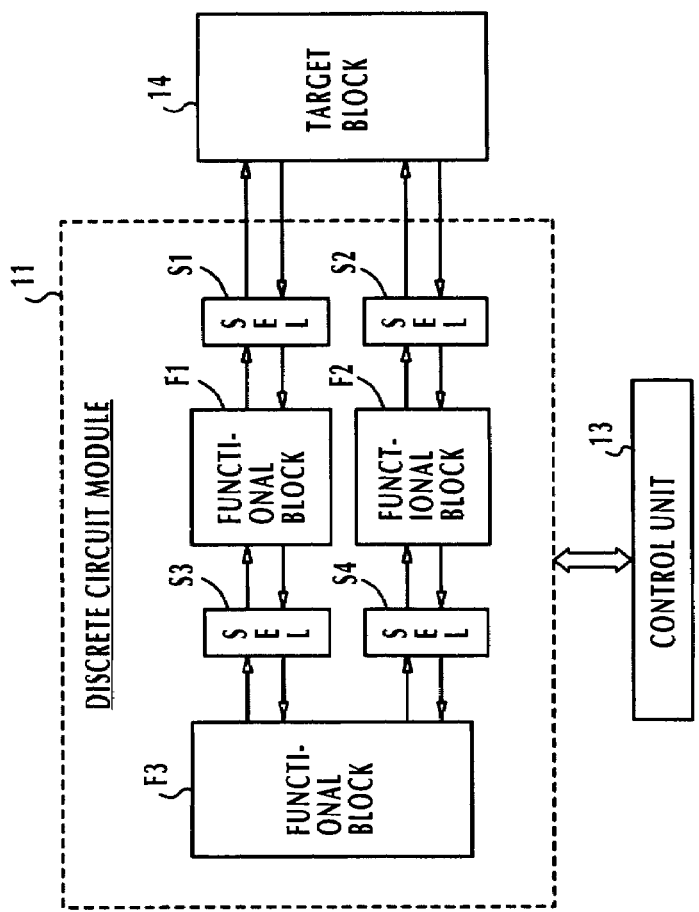
FIGS. 4A, 4B are schematic block diagrams of the signal processor configured in parallel and serial-parallel modes.
Figure 4A:
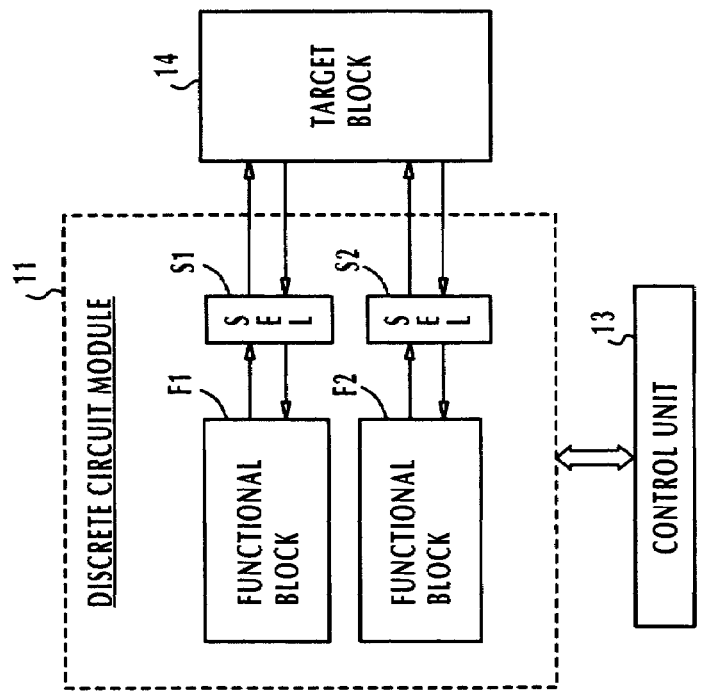

Instead of the serial configuration of functional block, functional blocks can be configured in parallel form as shown in FIGS. 4A and 4B. In FIG. 4A, the functional blocks F1, F2 are connected through selectors S1, S2 to the target block 14 to operate independently of each other. In FIG. 4B, the functional blocks F1 and F2 are connected through selectors S1, S2 to the target block 14 to operate individually and further connected through selectors S3 and S4 to a functional block F3 to operate interactively with each other. The number of functional blocks in a discrete circuit module and their configuration vary from module to module, depending on the function of each module. For example, if the signal processor is an engine control ECU, three functional blocks will be configured in parallel form to perform the functions of fuel injection control, ignition timing control and engine speed control.

In each of the signal processors M, the interface circuit 13 is a microprocessor-based controller constructed of a CPU, a ROM, a RAM and input/output devices, a LAN control module for communication with the server 7, and an A/D converter for communication with the support ECU 3 for converting a monitored analog signal from the discrete circuit module 11. The CPU of the control unit 13 performs data collection by sampling status signals from the discrete circuit block 11 at intervals and storing the sampled data into the RAM as log data and performs a log data delivery function by reading the RAM and sending the log data through the individual line 9 or LAN 8 to the support ECU 3.

In the support ECU 3, the reconfigurable circuit 31 is implemented with a gate array such as FPGA (Field Programmable Gate Array) or an FPAA (Field Programmable Analog Array), and the control unit 33 performs reconfiguration of the reconfigurable circuit 31 and control on input and output signals between the reconfigured circuit and the external circuits through LAN 8 and individual lines 9. Note that the FPGA is an integrated circuit chip on which an array of logic cells are created and their interconnections are determined to configure a digital pseudo-circuit by a computer program to implement a circuit function. The FPAA is an integrated circuit chip on which analog operational amplifiers, resistance and capacitance elements are created and configured into an analog pseudo-circuit according to programming data.

Similar to the control unit 13 of each signal processor M, the control unit 33 of the support ECU 3 is a microprocessor-based controller constructed of a CPU, a ROM, a RAM and input/output devices, a LAN control module for communication with the server 7, and an A/D converter for communication with each signal processor for converting an analog signal from the reconfigurable circuit 31. The CPU of the control unit 33 performs communication with the signal processors M through the individual lines 9 and LAN 8. The ROM of the control unit 33 maintains hardware-construction data that the control unit 31 uses to instruct the reconfigurable circuit 31 to create a pseudo-circuit that is equivalent to a failed functional block of any of the discrete circuit modules 11. In addition, the CPU of the control unit 33 uses the reconfigurable circuit 31 to perform an inspection and backup (fault recovery) routine on a selected signal processor M.

This inspection and backup routine is performed according to the flowchart of FIG. 5. This process is repeatedly performed immediately after the support ECU 3 is booted. The routine begins with step 101 by selecting one of the signal processors M1 through M4 as a target signal processor M which will undergo inspection. The selection of the target signal processor may be provided either according to a fairness rule in which all processors are selected at equal frequency or a priority rule in which signal processors are selected in descending order of priority level. At step 102, an inspection circuit K of the target processor is configured on the reconfigurable circuit 31, and the support ECU 3 retrieves part or whole log data from the target signal processor M (step 103). The amount of log data to be retrieved may be varied depending on whether anomaly is detected or not.

In one example, the inspection circuit K configured on the reconfigurable circuit 31 is composed of two inspection blocks KB1 and KB2, as shown in FIG. 7A. Each of these inspection blocks KB1, KB2 has a pseudo-circuit equivalent to the corresponding discrete circuit module 11 of the target signal processor M. If the discrete circuit module is of the same configuration as that shown in FIG. 2, each of the inspection blocks KB1 and KB2 consists of functional blocks KF1 and I<F2 respectively corresponding to the functional blocks F1 and F2 of discrete circuit block 11 and selectors KS1, KS2 corresponding respectively to the selectors S1, S2 of discrete circuit block 11. Inspection circuit K supplies test result signals to the control unit 33 in the same manner that the discrete circuit module 11 supplies input/output (I/O) data to the control unit 13. Note that, as shown in FIG. 8, the log data retrieved from the target signal processor M includes all log data retrieved during a period between the immediately preceding inspection routine and the current routine.

At step 104, inspection data (including I/O data) is selected from the log data. In one example, the inspection data is selected in the order in which it occurred. Using the selected test data, the inspection circuit K on the reconfigurable circuit 31 is activated, at step 105, to obtain test results from the inspection blocks KB1 and KB2 corresponding to the I/O data of the discrete circuit module 11. At step 106, a decision process is performed on the result data obtained at step 105 and the I/O data selected at step 104 in a manner as described below. Steps 104 to 106 are repeatedly executed until all test data are processed (step 107).

Figure 8:
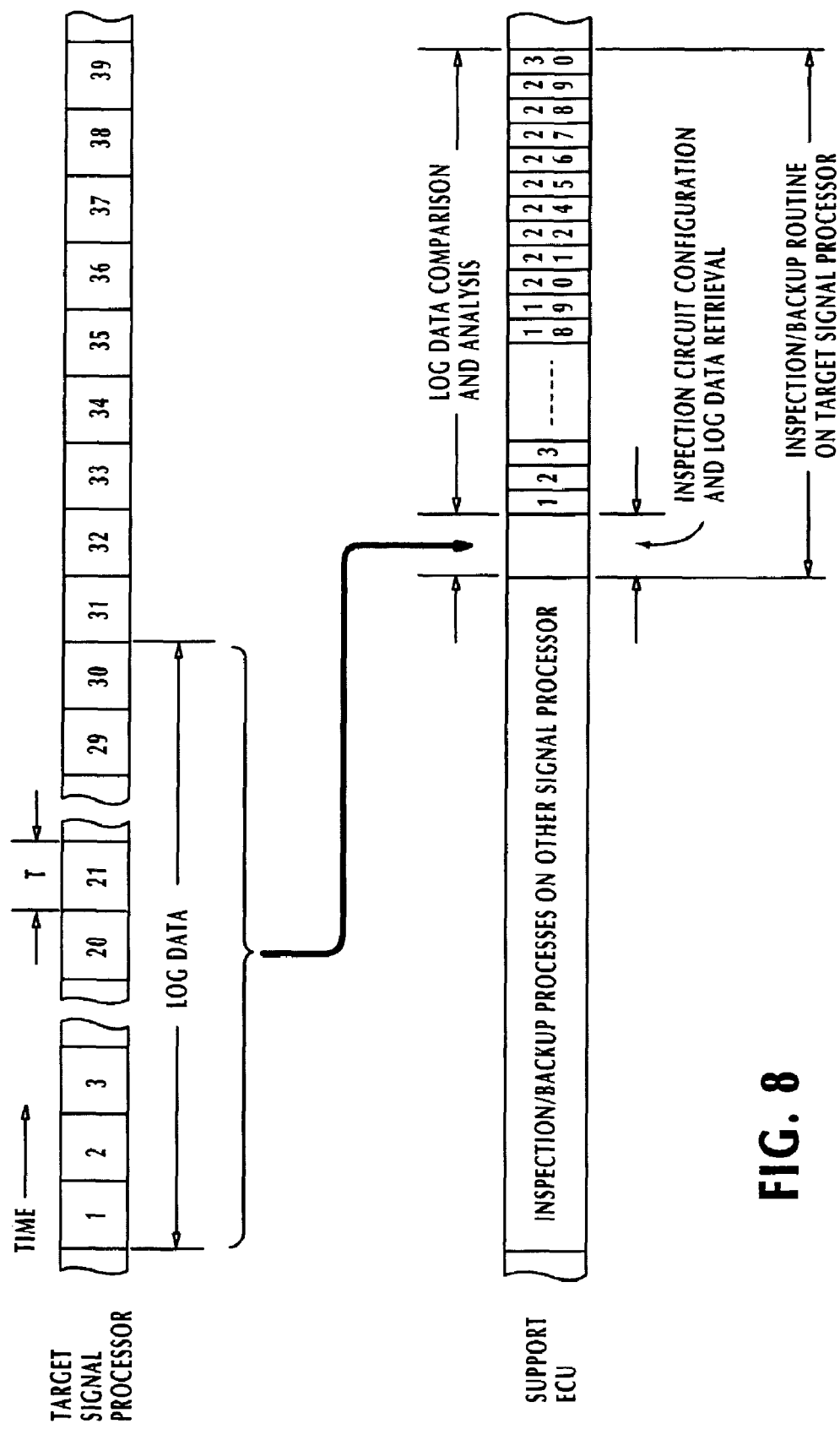
FIG. 8 is a timing diagram of log data maintained in a target signal processor and log data transferred from the target signal processor for data inspection and backup (fault recovery) routine

Note that decision step 106 is performed at intervals smaller than the interval "T" at which the log data is sampled as shown in FIG. 8, so that inspection/backup routines are performed for all signal processors on a time-shared basis.

The following is a description of the decision process of step 106 with reference to the flowchart of FIG. 6.

At step 201, the result data of the configured functional blocks KF1, KF2 of inspection blocks KB1, KB2 are compared with the I/O data of each target functional block (F1/F2) to determine whether they match or mismatch (step 202). If there is only one block that mismatches the other two blocks, the decision at step 202 is affirmative and flow proceeds to step 203 to determine if the mismatched block is the target block 11. If this is the case, flow proceeds to step 204 to determine whether same mismatches are repeated. This is done by examining previous records of mismatches that occurred during a predetermined time interval and determining the rate of occurrences of like mismatches. If the rate of mismatch occurrences exceeds a predetermined threshold, it is determined that same mismatches are repeated.

If the decision at step 204 is negative, flow proceeds to step 205 to notify abnormality, terminates the decision process and returns to FIG. 5. If the decision at step 204 is affirmative, flow proceeds to step 206 to notify that at least one of the target functional blocks F1 and F2 has failed.

Figure 7B:
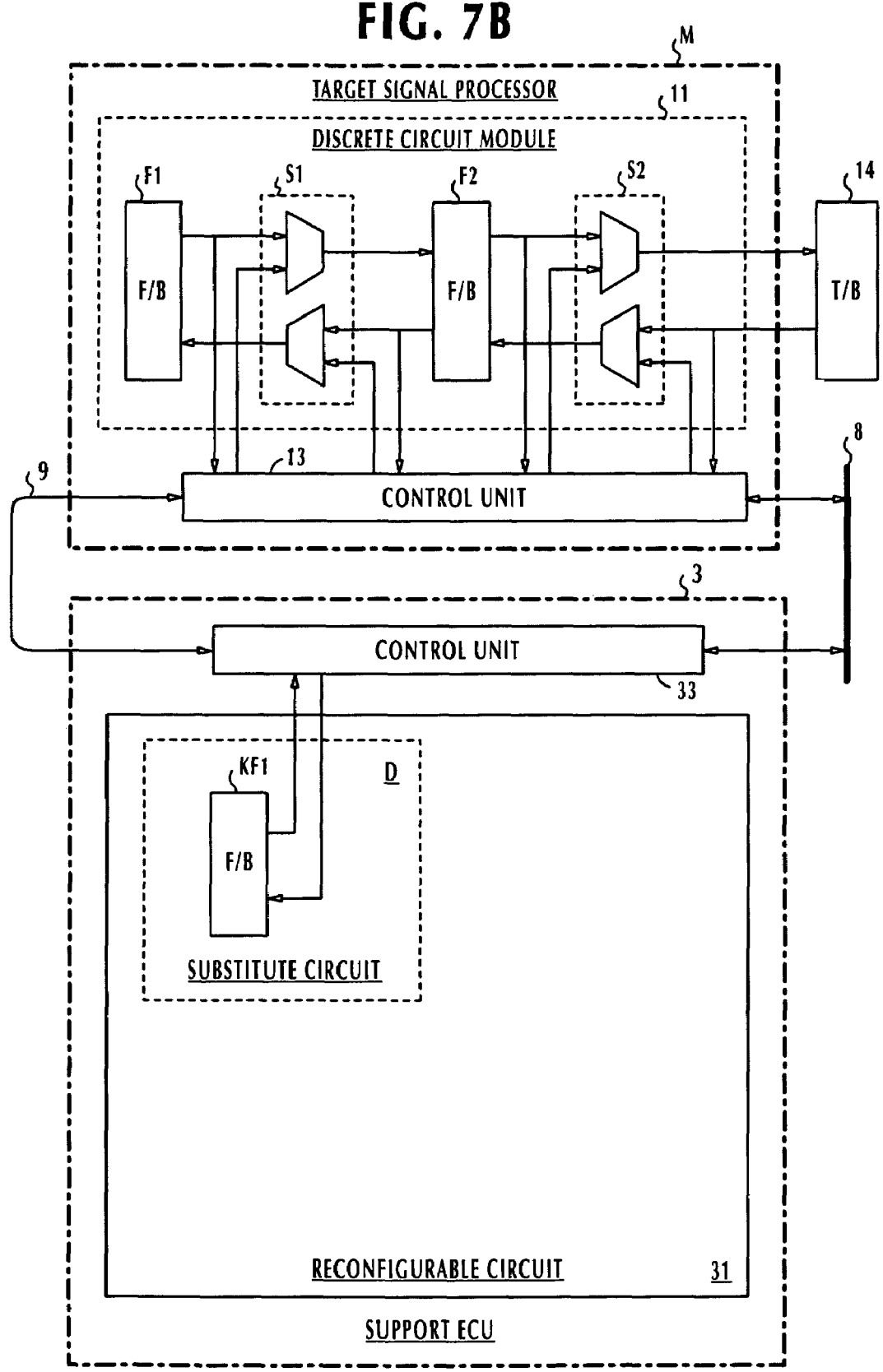
FIG. 7B is a block diagram of a signal processor and the support ECU in which a substitute circuit is extracted from the inspection block according to the first embodiment.

At step 207, an inspection block KF is extracted from the inspection block KB1 or KB2 to configure a substitute circuit D for a failed block as shown in FIG. 7B. If the functional block F1 is the failed block, the inspection block KF1 is extracted. The extraction is achieved by setting the selector S1 and the control units 13 and 33 so that the failed block F1 is isolated from block F2, the input signal of the failed block F1 is diverted to the input of the replacement circuit D via control line 9 and the output of replacement circuit D is connected to the input of functional block F2 via control line 9, instead of connecting the output of failed block F1. The provision of step 204 avoid useless replacement of the faulty functional block which could occur as a result of the system being interfered with external noise.

If the result of data comparison step 201 indicates that the mismatched block is one of the inspection blocks KB1 and KB2, rather than the target block, the decision at step 203 is negative and flow proceeds to step 208 to determine whether same mismatches are repeated by examining previous records of mismatches that occurred during a predetermined time frame and determining the rate of occurrences of like mismatches, as described above. If the decision is negative at step 208, the decision process is terminated and flow returns to FIG. 5. If the decision is affirmative, the mismatched inspection block is treated as a faulty block and flow proceeds from step 208 to step 209 to remove the faulty inspection block and build a new inspection block within the idle space of the reconfigurable circuit 31, and the routine returns to FIG. 5.

If the decision at step 202 is negative, a check is made as to whether each block mismatches other blocks (step 210). If this is the case, a notification is given that there is a likelihood of failure in one of the compared blocks (step 211), and flow returns to FIG. 5. If all the compared data match with each other, the decision at step 210 is negative. In this case, all the compared blocks are normal and the decision process is terminated, with flow returning to FIG. 5.

It is apparent from the above that a faulty functional block can be instantly replaced with a substitute circuit which forms part of the pseudo-circuit inspection circuit configured in the reconfigurable circuit 31.

Moreover, since it is not necessary to configure an inspection circuit K for each signal processor M, the scale of the system can be kept to a minimum. In addition, the replacement of a failed functional block with a substitute circuit D is performed on a per-block (F) basis, rather than on a per-processor (M) basis. Therefore, there is no likelihood of the reconfigurable circuit 31 being excessively occupied with substitute circuits. This permits efficient utilization of the reconfigurable circuit 31.

In the first embodiment of this invention, two inspection blocks KB1, KB2 are used to determine the abnormality of these blocks. If one of the inspection blocks is found faulty, a substitute circuit is constructed in an available area of the reconfigurable circuit 31. As a result, high reliability inspection is achieved.

Figure 9:
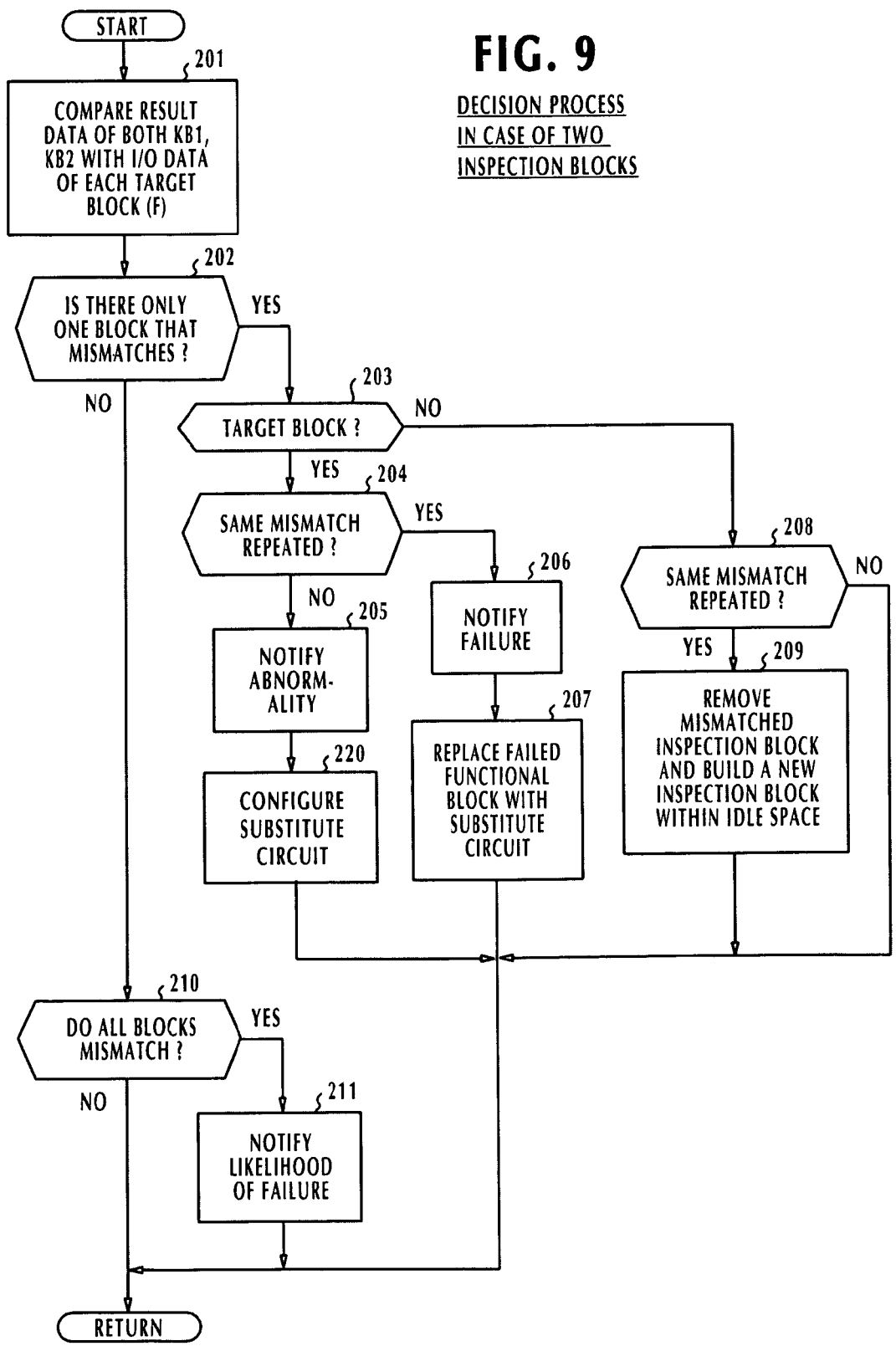
FIG. 9 is a flowchart of a modified decision process of FIG. 5 according to a second embodiment of the present invention.

The following is a description of a second embodiment of the present invention with reference to the flowchart of FIG. 9, which is similar to FIG. 6 with the exception that step 220 is provided following step 205.

Figure 10:
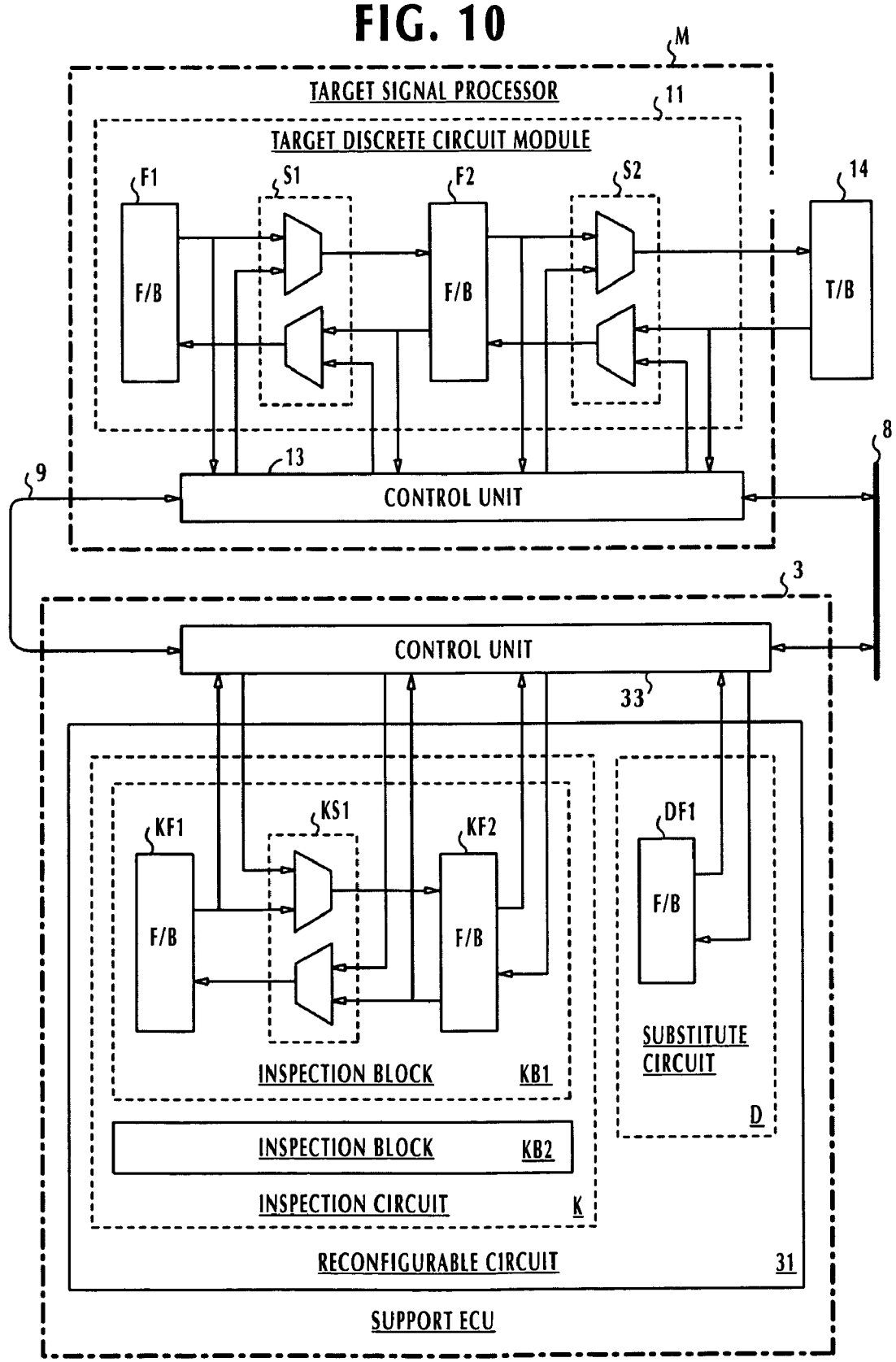
FIG. 10 is a block diagram of a signal processor and the support ECU in which two inspection blocks and a substitute circuit are configured in the reconfigurable circuit.

If the I/O data of target block F1 of processor M mismatches the result data of inspection blocks KB1, KB2, but this mismatch is not repeated mismatch, the decision at step 204 is negative and step 205 is executed to notify abnormality. Following the execution of step 205, step 220 is executed to configure, within an idle space of the reconfigurable circuit 31, a substitute circuit D including a functional block DF1 for as a replacement of the mismatched target block F1, as shown in FIG. 10. If the mismatch of the target block is a repeated event, flow branches out of step 204 and a failure notification is performed (step 206). Then, at step 207, the substitute circuit D configured at step 220 is used to replace the mismatched target block.

In this way, the substitute circuit D is provided as a separate entity from the inspection circuit K, rather than as part of the inspection circuit K of the previous embodiment Because of the pre-configured arrangement, this allows quick recovery of the faulty block. In addition, the inspection blocks KB1, KB2 can be configured as a dedicated diagnostic circuit that determines the validity of the inspection data.

Figure 11A:
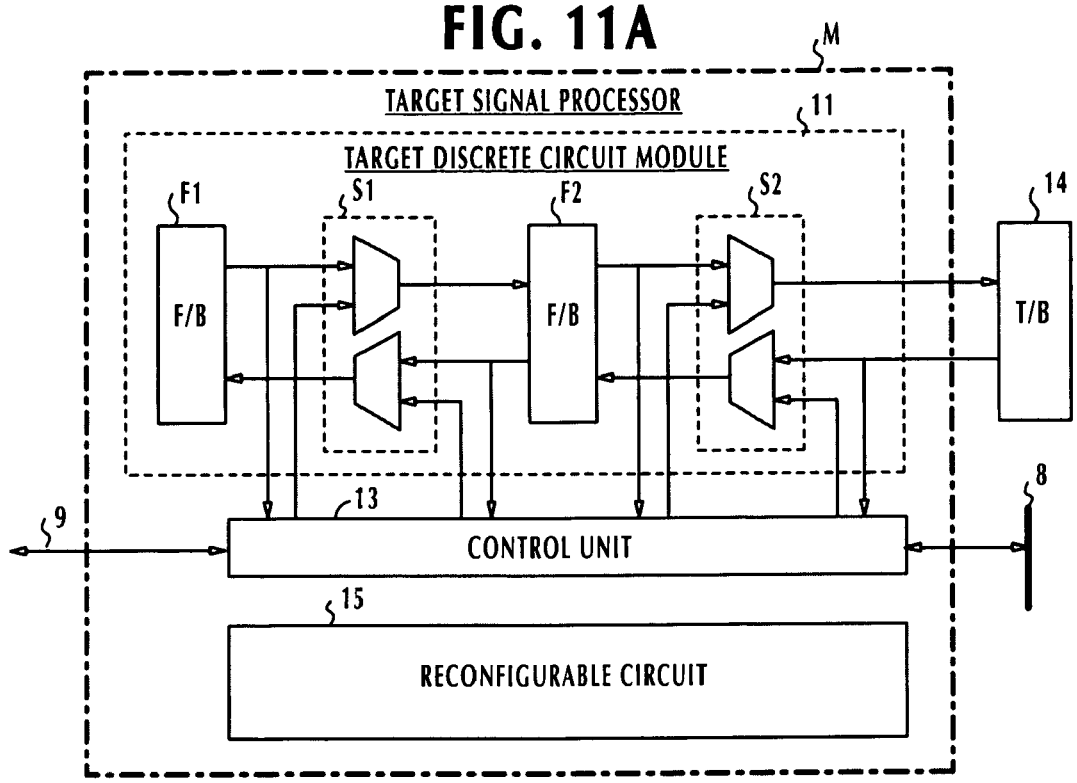
FIGS. 11A and 11B are block diagrams of a signal processor additionally provided with a reconfigurable circuit according to a third embodiment of the present invention.
Figure 11B:
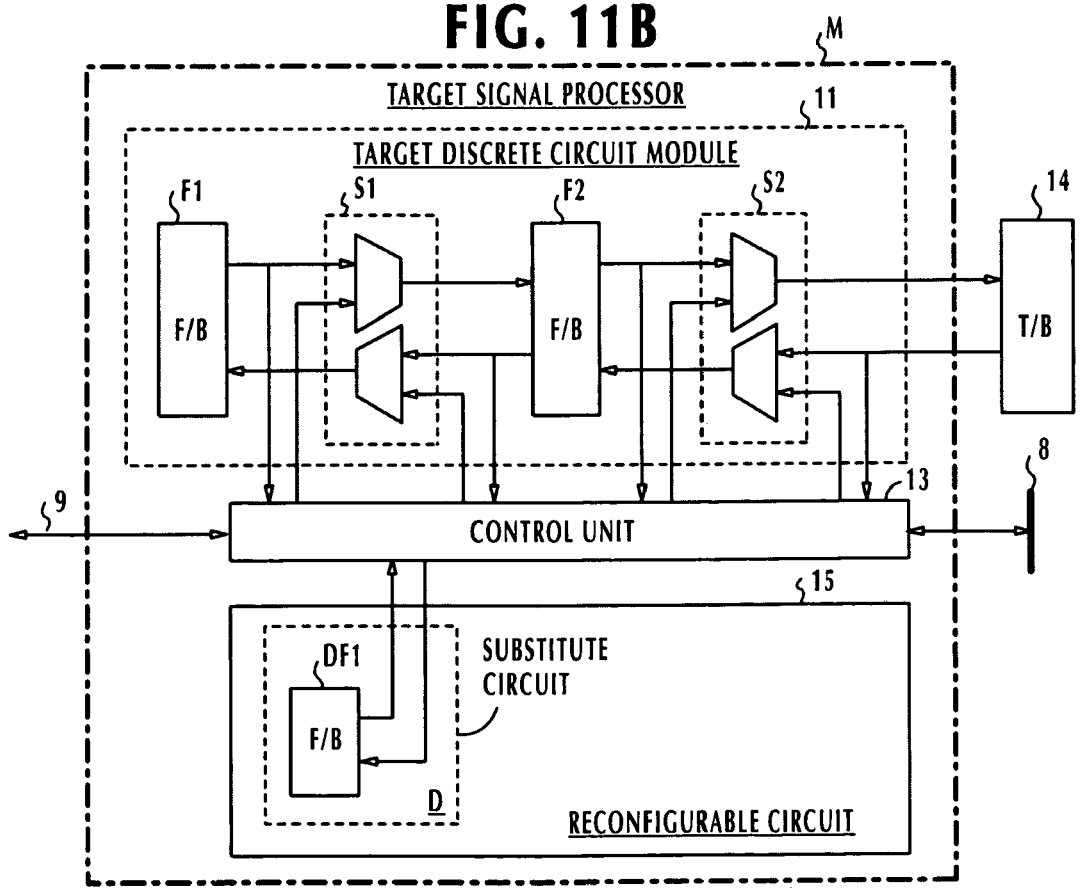

According to a third embodiment of the present invention, the signal processors M of the second embodiment is modified as shown in FIG. 11A by the inclusion of a reconfigurable circuit 15. The operation of the control unit 13 of each signal processor proceeds according to the flowchart of FIG. 9. When the control unit 33 of support ECU 3 executes step 220, it instructs the control unit 13 of a target signal processor to build a substitute circuit D in the reconfigurable circuit 15 of its own processor as shown in FIG. 11B, instead of building it in the reconfigurable circuit 31. When the control unit 31 proceeds to execute step 207, it replaces the faulty functional block with the substitute circuit D created in the target signal processor. Since the substitute circuit is configured in the reconfigurable circuit of the same target signal processor, this modification eliminates possible low system performance which would occur in the second embodiment due to a delay associated with the propagation of signals over the dedicated line 9.

Figure 14A:
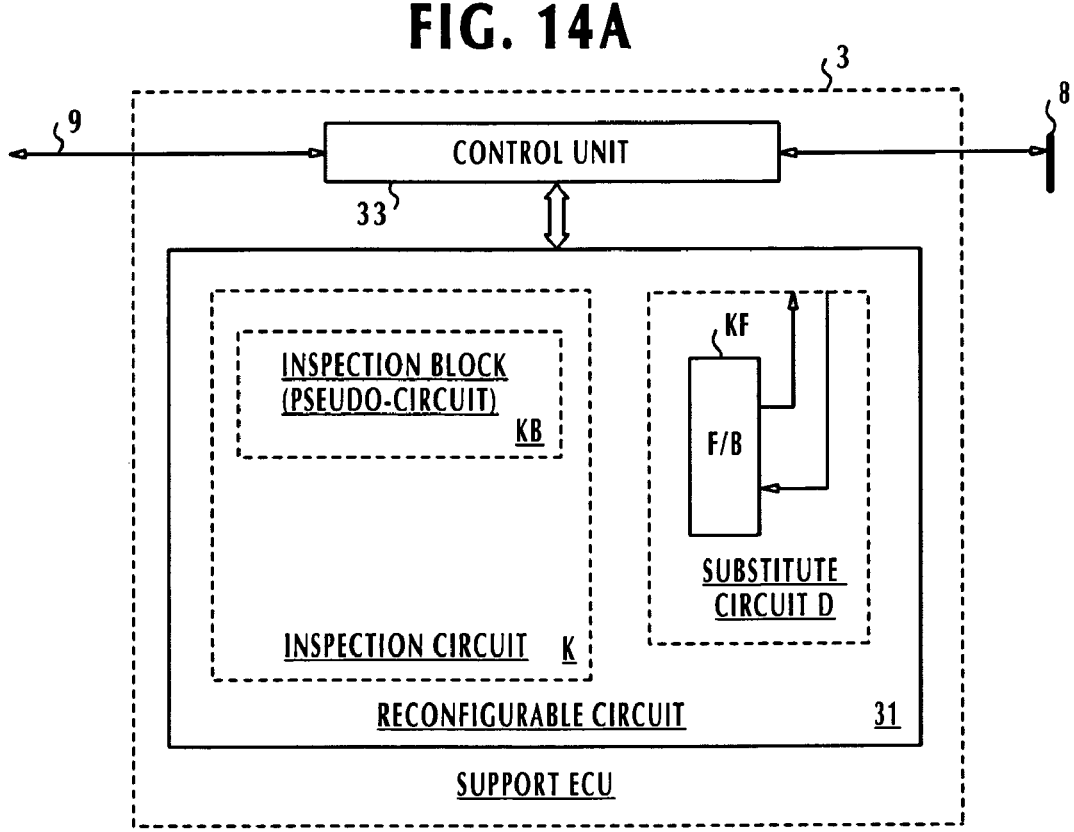
FIGS. 14A, 14B are block diagrams of a signal processor and the support ECU showing details of the reconfigurable circuit associated with the fourth and fifth embodiments of the invention.

According to a fourth embodiment of the present invention, the result data of only one inspection block is used for comparison with I/O data of a target block and the inspection block is reconfigured if a mismatch is detected between them. The target block is determined to be faulty if the same mismatch is repeated after the inspection block is reconfigured. If no mismatch occurs after the inspection block is reconfigured, it is determined that the inspection block is faulty. To implement this embodiment, the previous decision process is modified as shown in FIG. 12 and an inspection circuit K with only one inspection block KB is configured, at step 102 of FIG. 5, in the reconfigurable circuit 31 of support ECU 3 (see FIG. 14A) corresponding to the discrete circuit module 11 of the target processor M.

In FIG. 12, the decision process begins with step 301 in which the result data of inspection block KB is compared with the I/O data of each functional block (F1, for example) of the target signal processor M for a match or mismatch (step 302). If they mismatch, flow proceeds to step 303 to check to see if the same mismatch is repeated in the same manner as described earlier. If the decision at step 303 is negative, flow proceeds to step 304 to give abnormality notification of the target block F1. At step 305, the inspection circuit K is reconfigured, and flow returns to FIG. 5.

If the decision at step 303 is affirmative, flow proceeds to step 306 to give a failure notification of the target block F1. At step 307, a substitute circuit D is extracted from the inspection circuit K and the failed block F1 is replaced with the substitute circuit D, and flow returns to FIG. 5. If no mismatch is detected at step 302, no decision process is performed.

Figure 13:
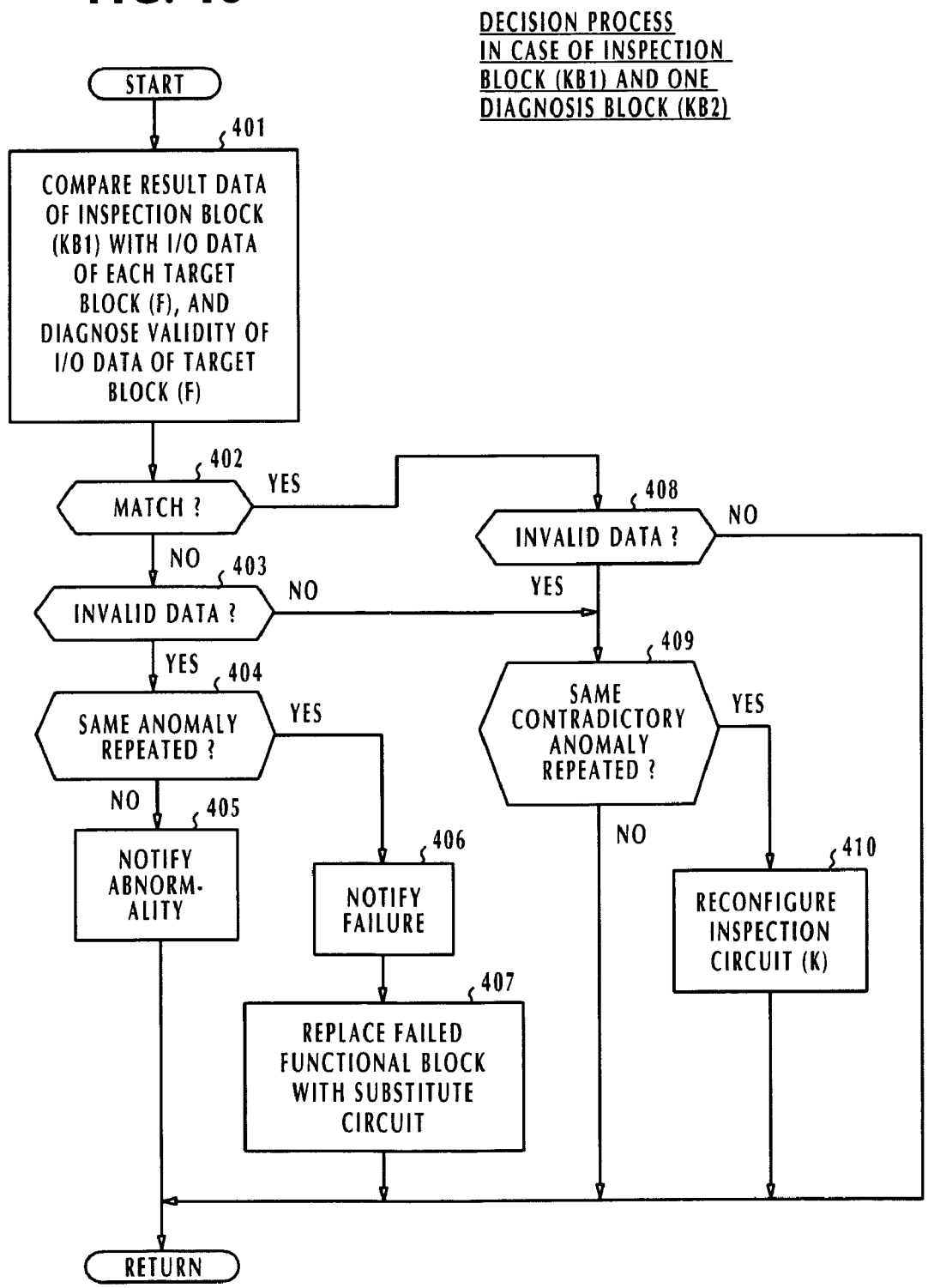
FIG. 13 is a flowchart of a still further modification of the decision process of FIG. 5 according to the fourth embodiment of the present invention.
Figure 14B:
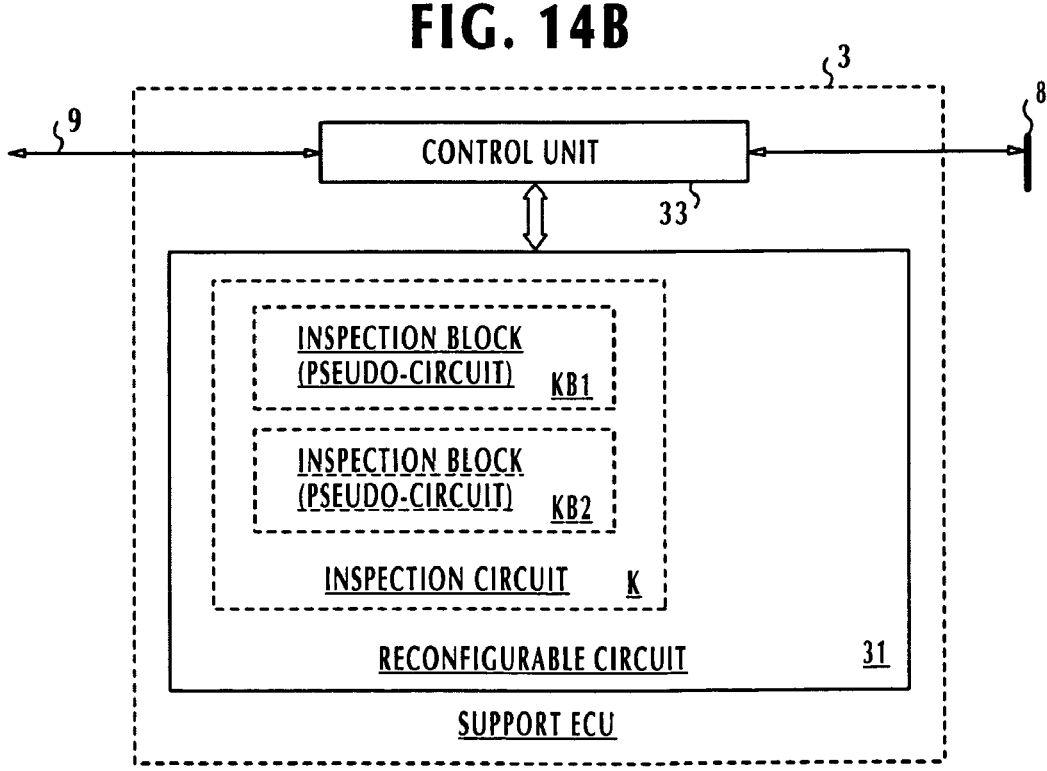

According to a fifth embodiment of the present invention, one inspection block (KB1) for data comparison and one diagnosis block (KB2) for I/O data validity check are configured, at step 102 of FIG. 5, in the reconfigurable circuit 31 (see FIG. 14B). FIG. 13 is the flowchart of the decision process of FIG. 5 to implement the fifth embodiment.

At step 401, the result data of inspection block KB1 is compared with the I/O data of each target block F to determine if they match (step 402), and the input and output data of the target block F are diagnosed to determine if they are valid (steps 403, 408).

If the comparison result indicates a mismatch and the diagnosis result indicates invalid data, the decision at step 402 is negative and the decision at steps 403 is affirmative. In this case, there is no contradiction between the two test results. Hence it is determined that the target block is abnormal. In this case, flow proceeds from step 403 to step 404 to determine whether same anomaly is repeated. If the decision is negative at step 404, abnormality of the target block is notified (step 405). If the decision is affirmative at step 404, failure of the target block is notified (step 406) and the failed block is replaced with a substitute circuit (step 407).

On the other hand, if the comparison result indicates a mismatch, while the diagnosis result indicates valid data (the decisions at steps 402 and 403 are both negative) or if the comparison result indicates a match, while the diagnosis result indicates invalid data (the decisions at steps 402 and 408 are both affirmative). In these cases, there is a contradiction between the two test results. Flow proceeds to step 409 to determine if the same contradictory anomaly is repeated. If so, it is highly likely that the inspection circuit K is abnormal and flow proceeds to step 410 to reconfigure the inspection blocks KB1 and KB2 in an idle space of the reconfigurable circuit 31, and returns to FIG. 5. If the decision is negative at step 409, it is not likely that the inspection circuit K is abnormal and flow returns to FIG. 5. If both of the two test results indicate normality, affirmative and negative decisions are successively taken at steps 402 and 408, and flow returns to FIG. 5. In this way, it is possible to determine whether the cause of a data mismatch is due to anomaly of the target processor M or anomaly of the inspection circuit K, i.e., the reconfigurable circuit 31.

Note that, while part of the inspection block KB1 is used to configure a substitute circuit D, the latter may be constructed independently of the inspection block as described in connection with the second embodiment of the present invention, or constructed in the reconfigurable circuit 15 of the target processor M as described in connection with the third embodiment of the present invention. In the latter case, the substitute circuit D is configured immediately after step 405 is executed.

While mention has been made of embodiments in which only one support ECU is provided, the present invention could equally be as well applied to embodiments in which a plurality of support ECUs are provided respectively for the LAN segments N1 through N4, so that the support ECUs are responsible for the inspection/backup operation of the individual functions of the signal processors.

Furthermore, while the decision process is performed on a per-functional block basis, the present invention could equally be as well used in an embodiment in which the decision process is initially performed on all discrete circuit modules 11, and only if anomaly is detected in this initial test, the per-block mode decision process is performed.

What is claimed is:

1. A signal processing system comprising:
   a plurality of signal processors, each having a plurality of functional blocks;
   a reconfigurable circuit; and
   control circuitry associated with said signal processors and said reconfigurable circuit, said control circuitry selecting one of the signal processors as a target processor, configuring an inspection circuit having equivalent functions to the target processor in said reconfigurable circuit, retrieving input/output data from each functional block of said target processor, performing inspection on the functional block by using said inspection circuit and said input/output data to produce an inspection result, and replacing said functional block with a substitute circuit which forms part of said inspection circuit if said inspection result indicates that said functional block is faulty.

2. The signal processing system of claim 1, wherein said control circuitry configures said substitute circuit in said reconfigurable circuit if said inspection result indicates that said functional block of said target processor is likely to fail and replaces said functional block with the configured substitute circuit if said inspection result subsequently indicates that said functional block is faulty.

3. The signal processing system of claim 2, wherein said target processor includes a reconfigurable circuit, and wherein said control circuitry configures said substitute circuit in the reconfigurable circuit of the target processor.

4. The signal processing system of claim 1, wherein said inspection circuit comprises a plurality of inspection blocks having respective functions equivalent to said functional blocks of said target processor,
   wherein said control circuitry performs inspection on said functional block by using said plurality of inspection blocks and said input/output data to produce an inspection result indicating whether said functional block or one of said inspection blocks on said reconfigurable circuit.

5. The signal processing system of claim 4, wherein said control circuitry configures a substitute inspection circuit in an idle space of said reconfigurable circuit if said inspection result indicates that one of said inspection blocks is faulty.

6. The signal processing system of claim 1, wherein said control circuitry replaces said faulty functional block with said substitute circuit if said inspection result repeatedly indicates that said functional block is likely to fail.

7. The signal processing system of claim 1, wherein said plurality of signal processors are attached to a local area network.

8. The signal processing system of claim 1, wherein said plurality of signal processors are divided into a plurality of LAN segments connected to a common communication medium.

9. The signal processing system of claim 8, wherein the signal processors of each of said LAN segments have unique vehicle-associated functions which differ from unique functions of the other LAN segments.

10. The signal processing system of claim 1, wherein said control circuitry is connected to said plurality of signal processors via individual communication mediums.

11. A method of restoring a signal processing system from failure, wherein said signal processing system comprises a reconfigurable circuit and a plurality of signal processors each having a plurality of functional blocks, comprising the steps of:
   a) selecting one of the signal processors as a target processor;
   b) configuring an inspection circuit having equivalent functions to the target processor in said reconfigurable circuit;
   c) retrieving input/output data from each functional block of said target processor;
   d) performing inspection on the functional block by using said inspection circuit and said input/output data to produce an inspection result; and
   e) replacing said functional block with a substitute circuit which forms part of said inspection circuit if said inspection result indicates that said functional block has failed.

12. The method of claim 11, further comprising the steps of configuring said substitute circuit in said reconfigurable circuit if said inspection result of step (d) indicates that said functional block of said target processor is likely to fail and repeating steps (d) and (e),
   wherein step (e) comprises the step of replacing said functional block with the configured substitute circuit if said inspection result of step (d) subsequently indicates that said functional block has failed.

13. The method of claim 11, further comprising the step of repeating steps (d) and (e), and wherein step (e) comprises the step of replacing said functional block with said substitute circuit if said inspection result repeatedly indicates that said functional block is likely to fail.

14. The method of claim 11, wherein said target processor includes a reconfigurable circuit, and wherein step (b) comprises the step of configuring said substitute circuit in the reconfigurable circuit of the target processor.

15. The method of claim 11, wherein said inspection circuit comprises a plurality of inspection blocks corresponding to said functional blocks of the target processor, wherein step (d) comprises the steps of:
   $d_1$) selecting inspection data from the retrieved input/output data;
   $d_2$) activating a plurality of said inspection blocks to perform inspection on said functional block by using the selected inspection data;
   $d_3$) comparing results of the inspection performed by said plurality of inspection blocks with input/output data of said functional block to produce a comparison result; and
   $d_4$) determining whether said comparison result indicates that said functional block is faulty or likely to fail and at least one of inspection blocks is faulty,
   wherein step (e) comprises the steps of:
   $e_1$) replacing the faulty functional block with said substitute circuit if said functional block is faulty; and
   $e_2$) reconfiguring said inspection circuit in an idle space of said reconfigurable circuit if one of said inspection blocks is faulty.

16. The method of claim 15, wherein step ($d_5$) comprises the steps of:

if said functional block is faulty and said comparison result indicates that like mismatches have occurred, replacing said functional block with said substitute circuit; and if one of said inspection blocks is faulty and said comparison result indicates that like mismatches have occurred, reconfiguring said inspection circuit in said reconfigurable circuit.

17. The method of claim 15, further comprising the step of configuring said substitute circuit in said reconfigurable circuit if step ($d_4$) determines that said functional block is likely to fail.

18. The method of claim 11, wherein said inspection circuit comprises a plurality of inspection blocks corresponding to said functional blocks of the target processor, further comprising the step of repeating steps (d) and (e), wherein step (d) comprises the steps of:

$d_1$) selecting inspection data from the retrieved input/output data;

$d_2$) activating one of said inspection blocks to perform inspection on said functional block by using the selected inspection data;

$d_3$) comparing a result of the inspection performed by said one of said inspection blocks with input/output data of said functional block to produce a comparison result; and $d_4$) if said comparison result indicates that there is a mismatch between said compared data, determining whether said mismatch is a repeated mismatch or a non-repeated mismatch, wherein step (e) comprises the steps of:

$e_1$) if said mismatch is a repeated mismatch, identifying said functional block as a faulty block and replacing the faulty block with said substitute circuit; and $e_2$) if said mismatch is a non-repeated mismatch, reconfiguring said inspection circuit in an idle space of said reconfigurable circuit.

19. The method of claim 11, wherein said inspection circuit comprises a plurality of inspection blocks corresponding to said functional blocks of the target processor, wherein step (d) comprises the steps of:

$d_1$) selecting inspection data from the retrieved input/output data;

$d_2$) activating a plurality of said inspection blocks to perform inspection on said functional block by using the selected inspection data and perform diagnosis on validity of input/output data of said functional block;

$d_3$) comparing a result of the inspection performed by said one of said inspection blocks with said input/output data to produce a comparison result; and $d_4$) determining whether said comparison result indicates that there is a match or mismatch between said compared data and whether said diagnosis indicates that there is valid input/output data or invalid input/output data, wherein step (e) comprises the steps of:

$e_1$) if said mismatch and invalid input/output data are detected, identifying said functional block as a faulty block and replacing the faulty block with said substitute circuit; and $e_2$) if said match and invalid input/output data are detected or if said mismatch and valid input/output data are detected, reconfiguring said inspection circuit in an idle space of said reconfigurable circuit.

20. The method of claim 19, further comprising the step of repeating steps (d) and (e), wherein step ($e_1$) comprises the step of identifying said functional block as a faulty block if said mismatch and invalid input/output data are repeatedly detected and wherein step ($e_2$) reconfiguring said inspection circuit in said reconfigurable circuit if said match and invalid input/output data are repeatedly detected or if said mismatch and valid input/output data are repeatedly detected.

* * * * *